United States Patent [19]

Kawamura et al.

[11] 4,222,928
[45] Sep. 16, 1980

[54] POLYESTER COMPOSITION

[75] Inventors: Takeo Kawamura; Teruo Matsunaga, both of Sagamihara, Japan

[73] Assignee: Teijin Limited, Osaka, Japan

[21] Appl. No.: 958,488

[22] Filed: Nov. 7, 1978

[30] Foreign Application Priority Data

Nov. 9, 1977 [JP] Japan ............................ 52-133583
Dec. 15, 1977 [JP] Japan ............................ 52-149905
May 22, 1978 [JP] Japan ............................ 53-59890

[51] Int. Cl.$^2$ .................... C08L 63/00; C08L 67/00
[52] U.S. Cl. .................... 260/40 R; 525/107; 525/438
[58] Field of Search ........... 260/835, 40 R; 525/107, 525/438

[56] References Cited

U.S. PATENT DOCUMENTS

| | | | |
|---|---|---|---|
| 3,361,848 | 1/1968 | Siggel | 260/873 |
| 3,560,605 | 2/1971 | Siggel | 260/835 |
| 3,886,104 | 5/1975 | Borman | 260/835 |
| 3,909,485 | 9/1975 | Hongo | 260/835 |
| 3,950,301 | 4/1976 | Balog | 260/40 R |
| 3,965,212 | 6/1976 | Kamada | 260/835 |
| 3,969,306 | 7/1976 | Borman | 260/40 R |
| 4,010,219 | 5/1977 | Aoyama | 260/835 |
| 4,035,333 | 7/1977 | Kamada | 260/835 |
| 4,040,122 | 4/1977 | Borman | 260/835 |
| 4,073,827 | 2/1978 | Okasaka | 260/835 |
| 4,080,354 | 3/1978 | Kramer | 260/40 R |
| 4,111,892 | 9/1978 | Kamada | 260/40 R |
| 4,141,882 | 2/1979 | Kodama | 260/40 R |
| 4,157,325 | 6/1979 | Charles | 260/40 R |

FOREIGN PATENT DOCUMENTS 49-90345 8/1974 Japan .
50-1146 1/1975 Japan .
50-23449 3/1975 Japan .
51-44160 4/1976 Japan .

*Primary Examiner*—Paul Lieberman
*Attorney, Agent, or Firm*—Sherman & Shalloway

[57] ABSTRACT

A novel polyester composition which can give shaped articles being free from warping and having superior mechanical and thermal properties. The polyester composition comprises (A) 100 parts by weight of an aromatic polyester, (B) 5 to 150 parts by weight of flat glass flakes, and based on the total weight of (A) and (B), (C) 0.01 to 10% by weight of an epoxy compound containing two epoxy groups, and optionally (D) 0.01 to 5% by weight of a phosphorus compound and/or (E) 0.5 to 50% by weight of a rubbery elastomer selected from the group consisting of copolymers containing 30 to 90% of an acrylic ester as a constituent monomer and poly(ether.ester) elastomers. Up to half of the flat glass flakes may be replaced by a powdery inorganic solid such as feldspar.

9 Claims, No Drawings

POLYESTER COMPOSITION

This invention relates to a polyester composition, and more specifically, to a polyester composition which gives shaped articles free from warping and having superior mechanical and thermal properties.

Attempts have been made in recent years to substitute engineering plastics partly for component parts of automobiles, electrical appliances, etc., and consequently, the demand for engineering plastics, especially those reinforced with reinforcing materials, has increased. One group of these engineering plastics includes polyalkylene terephthalates, especially reinforced polyalkylene terephthalate compositions.

Fibrous inorganic materials such as glass fibers have been widely used as reinforcing materials for polyalkylene terephthalates. Certainly, these fibrous inorganic materials are useful because they increase the heat distortion temperatures of polyalkylene terephthalates and improve their mechanical properties. But since they have directionality, they have the defect of causing "warping" to plate-like shaped articles prepared from plastics reinforced by these materials.

In an attempt to remedy this defect, addition of scale-like mica was suggested. The mica is effective for reducing the "warping" of the plate-like shaped articles. However, it scarcely reduces "warping", or rather increases it, when contained in ribbed shaped articles or box-like shaped articles. Moreover, shaped articles containing mica have the defect of low impact strength and of marked coloration ascribable to mica. It has been desired therefore to provide a polyester resin composition which can afford shaped articles being free from warping and having superior mechanical and thermal properties and a good color.

The present inventors, as a result of their efforts to provide such a polyester resin composition, found that a composition comprising an aromatic polyester and a specified amount of flat glass flakes can meet these requirements to some extent. They, however, noted that shaped articles from this composition do not have entirely satisfactory mechanical and thermal properties, and are still desired to be improved. Further investigations finally led to the discovery that the mechanical and thermal properties of such shaped articles can be improved greatly by further adding a specified amount of a specific epoxy compound to such a composition.

Thus, according to this invention, there is first provided a polyester composition comprising 100 parts by weight of an aromatic polyester, 5 to 150 parts by weight of flat glass flakes, and 0.01 to 10% by weight, sed on the total weight of these two ingredients, of an epoxy compound.

The flat glass flakes used in this invention, after having been incorporated in the polyester resin, have a long diameter of not more than 1,000 microns, preferably 1 to 500 microns, and an aspect ratio, defined as the ratio of the long diameter to thickness, of at least 5, preferably at least 10, especially at least 20. Glass flakes commercially available may be used, and sometimes, they undergo some pulverization when being mixed with the polyester resin.

When the long diameter of the glass flakes exceeds 1,000 microns, it is difficult to mix them uniformly with the resin, and the properties of shaped articles prepared from the resulting resin composition are variable. Glass flakes having an aspect ratio of less than 5 do not have an effect of increasing the heat distortion temperature of the polyester resin.

The amount of the flat glass flakes used is 5 to 150 parts by weight, preferably 20 to 100 parts by weight, per 100 parts by weight of the aromatic polyester. Amounts smaller than 5 parts by weight cannot sufficiently achieve the effect of this invention. When the amount exceeds 150 parts by weight, the glass flakes are difficult to mix uniformly with the polyester, and the moldability of the polyester composition is reduced. When the amount of the glass flakes exceeds 100 parts by weight, the flow characteristics of the resin are reduced during the shaping of the resin composition. Accordingly, it is desirable to exercise a full control over the shaping conditions.

Up to one half of the flat glass flakes can be replaced by a powdery inorganic solid. This replacement is desirable because not only can it reduce the cost of production, but also it can increase the weld strength ratio (the ratio of the tensile strength of a shaped article having a weld to that of a shaped article containing no weld) of the shaped article. When more than one half of the flat glass flakes is replaced by the powdery inorganic solid, the weld strength ratio rather decreases. The powdery inorganic solid broadly includes fillers which are usually added to resins or rubbers to extend them, adjust their viscosities, or to improve their properties. Examples of this inorganic solid are calcium carbonate, titanium oxide, feldspar (for example, Minex sold by shiraishi Kogyo K.K.), clay, white carbon, carbon black, kaolin clay, and talc. The particle size of the inorganic solid is not particularly critical, and may be those of commercially available solids. However, it is preferably 1 to 50 microns, and inorganic solids having an average particle diameter of not more than 30 microns are especially preferred.

The aromatic polyester used in this invention is typically a polyester derived from terephthalic acid as an acid component and at least one aliphatic diol containing 2 to 10 carbon atoms such as ethylene glycol, trimethylene glycol, tetramethylene glycol, hexamethylene glycol or neopentyl glycol as a glycol component. Polytetramethylene terephthalate, polypropylene terephthalate and polyethylene terephthalate which have a fast rate of crystallization are among preferred aromatic polyesters for use in this invention. Polytetramethylene terephthalate is especially preferred.

Products resulting from the partial replacement of the molecules of such aromatic polyesters by a comonomer component can also be used in this invention. Examples of such a comonomer include phthalic acids such as isophthalic acid and orthophthalic acid; alkyl-substituted phthalic acids such as 3-methylterephthalic acid and 4-methylisophthalic acid; naphthalenedicarboxylic acids such as 2,6-naphthalenedicarboxylic acid, 2,7-naphthalenedicarboxylic acid and 1,5-naphthalenedicarboxclic acid; diphenyldicarboxylic acids such as 4,4'-diphenyldicarboxylic acid and 3,4'-diphenyldicarboxylic acid; other aromatic dicarboxylic acids such as 4,4'-diphenoxyethanedicarboxylic acid; aliphatic or alicyclic dicarboxylic acids such as succinic acid, adipic acid, sebacic acid, azelaic acid, decanedicarboxylic acid and cyclohexanedicarboxylic acid; alicyclic diols such as 1,4-cyclohexanedimethanol; dihydroxybenzenes such as hydroquinone and resorcinol; bisphenols such as 2,2-bis(4-hydroxyphenyl)propane and 2,2-bis(4-hydroxyphenyl)sulfone; aromatic diols such as an ether diol derived from a bisphenol (e.g., 2,2-bis(4- hydroxyphenyl)propane) and a glycol (e.g., ethylene glycol); and hydroxycarboxylic acids such as ε-hydroxycaproic acid, hydroxybenzoic acid and hydroxyethoxybenzoic acid.

Also useful in this invention are products obtained by copolymerizing not more than 1.0 mole%, preferably not more than 0.5 mole%, more preferably not more than 0.3 mole% of a tri- or tetra-functional ester-forming acid such as tricarballylic acid, trimesic acid or trimellitic acid or a tri- or tetra-functional ester-forming alcohol such as glycerol, trimethylol propane or pentaerythritol.

Desirably, the aromatic polyester used in this invention has a reduced viscosity ($\eta_{sp/c}$) of at least 0.70, preferably at least 0.80, especially at least 0.90. The reduced viscosity is measured in ortho-chlorophenol at 35° C. in a concentration of 1.2 g/100 ml. The aromatic polyesters can be prepared by ordinary methods, for example melt polycondensation, or a combination of it with solid-phase polymerization. For example, polytetramethylene terephthalate can be produced by reacting terephthalic acid or its ester-forming derivative such as a lower alkyl ester thereof (e.g., dimethyl ester or monomethyl ester) with tetramethylene glycol or its ester-forming derivative under heat in the presence of a catalyst, and polymerizing the resulting glycol ester of terephthalic acid in the presence of a catalyst until the desired degree of polymerization is reached.

The epoxy compound used in this invention may be any epoxy compound containing two epoxy groups, and known epoxy ethers and epoxy esters can be used. Epoxy compounds containing one epoxy group have been found to be useless in improving mechanical and thermal properties. Use of epoxy compounds containing three or more epoxy groups can improve mechanical and thermal properties, but under excessive heat, the polyester tends to assume a three dimensional structure and therefore has reduced moldability. Furthermore, the surface characteristics of shaped articles prepared from it will be impaired. Typical examples of the epoxy compound used in this invention are bisphenol-type epoxy compounds, novolak-type epoxy compounds and aliphatic epoxy compounds. Diglycidyl polyether (mono- to deca-mers) obtained by the reaction of 2,2-bis(4-hydroxyphenyl)propane (bisphenol A) with epichlorohydrin, and diglycidyl ether obtained by the reaction of a glycol with epichlorohydrin are especially preferred.

The amount of the epoxy compound to be added is 0.01 to 10 parts by weight based on the total weight of the aromatic polyester and the flat glass flakes.

The composition of this invention comprising the aromatic polyester, the flat glass flakes (and powdery inorganic solid) and the epoxy compound gives shaped articles being free from "warping" and having greatly improved mechanical and thermal properties. However, depending upon its constituents and their proportions, the composition may have insufficient stability in the molten state. For example, when the residence time is prolonged even a little in the melt kneading of the composition by an extruder, an injection molding machine, etc. the melt viscosity of the composition changes drastically. As a result, the extrusion stability of the composition may be impaired, or its flowability may be decreased drastically, resulting in shaped articles having poor appearance. The present inventors have found that the stability of the composition in the molten state can be improved by incorporating 0.01 to 5%, based on the total weight of the aromatic polyester and the flat glass flakes, of a certain phosphorus compound into the composition. Accordingly, as one modification, the present invention also provides a composition comprising 100 parts by weight of an aromatic polyester, 5 to 150 parts by weight of flat glass flakes (up to one half of the flakes can be replaced by a powdery inorganic solid), and 0.01 to 10%, based on the total weight of said ingredients, of an epoxy compound containing two epoxy groups, and 0.01 to 5%, on the same basis, of a phosphorus compound.

Examples of the phosphorus compound are phosphoric acid; phosphoric esters such as trimethyl phosphate, methyldiethyl phosphate, triethyl phosphate, triisopropyl phosphate, tributyl phosphate, triphenyl phosphate, tribenzyl phosphate, or tricyclohexyl phosphate; phosphorous acid; phosphorous acid esters such as trimethyl phosphite, triethyl phosphite, tributyl phosphite, tri(δ-hydroxybutyl) phosphite or triphenyl phosphite; phosphonic acid; phosphonic acid derivatives such as phenyl phenylphosphonate, diphenyl phenylphosphonate or phenyl phosphonate; phosphinic acid; phosphinic acid derivatives such as phenylphosphinic acid, methyl dimethylphosphinate, phenyl methylphosphinate or triphenyl phosphine; triphenyl phosphine oxide; and metal phosphates such as monosodium phosphate, monopotassium phosphate or monolithium phosphate. These phosphorus compounds may be used singly or as a mixture of two or more.

Since the flat glass flakes are composed of various inorganic oxides, they can function fully as a ring-opening catalyst for the epoxy compound. In addition, because the composition of this invention is exposed to very high temperatures during melt kneading in an extruder or an injection molding machine, the reaction of the epoxy compound proceeds further. The phosphorus compound is believed to act in a way to inhibit the excessive progress of the reaction of the epoxy compound. When the flat glass flakes are weakly alkaline, they will exert undesirable effects on the aromatic polyester (for example, reduce the mechanical properties of the polyester). The phosphorus compound is believed to alleviate these effects, too.

When it is desired to further improve the impact strengths and tap strengths of polyester shaped articles, the composition of this invention may be incorporated with a rubbery elastomer selected from copolymers containing 30 to 90% of an acrylic ester as a constituent monomer and poly(ether.ester)elastomers. Accordingly, as another modification, the present invention provides a composition comprising 100 parts by weight of an aromatic polyester, 5 to 150 parts by weight of flat glass flakes (up to a half of the flakes can be replaced by a powdery inorganic solid), and based on the total weight of said ingredients, (0.01 to 5% of a phosphorus compound and) 0.5 to 5% of a rubbery elastomer.

Specifically, the copolymer containing 30 to 90% of an acrylic ester as a constituent monomer denotes a graft copolymer, random copolymer or block copolymer composed of 30 to 90% of an alkyl acrylate with the alkyl group containing 1 to 13 carbon atoms and 70 to 10% of a vinyl monomer such as a lower alkyl methacrylate, styrene, acrylonitrile, triallyl isocyanurate, or allyl methacrylate.

The poly(ether.ester)elastomer is an elastomer derived from (1) a dicarboxylic acid and/or its ester-forming derivative, (2) a low-molecular-weight glycol and-/or its ester-forming derivative, and (3) a polyoxyalkylene glycol having an average molecular weight of 500 to 5,000 and/or its ester-forming derivative, in which the polyester derived from components (1) and (2) has a melting point of at least 140° C., and the unit derived from component (3) accounts for 5 to 95% by weight of the entire polymer.

Typically, the component (1) is an aromatic dicarboxylic acid. Examples of preferred aromatic dicarboxylic acids are terephthalic acid, isophthalic acid, naphthalenedicarboxylic acids, diphenylcarboxylic acid, diphenylsulfonedicarboxylic acid, diphenoxyethanedicarboxylic acid, diphenylether dicarboxylic acid, methylterephthalic acid, and methylisophthalic acid. Terephthalic acid is especially preferred. A part, preferably not more than 30 mole%, more preferably not more than 20 mole%, of the component (1) may be replaced by another dicarboxylic acid. Examples of other dicarboxylic acids include aliphatic dicarboxylic acids such as succinic acid, adipic acid, sebacic acid, dodecanedicarboxylic acid or dimeric acid, alicyclic dicarboxylic acids such as hexahydroterephthalic acid, and hydroxycarboxylic acids such as $\epsilon$-hydroxycaproic acid, hydroxybenzoic acid or hydroxyethoxybenzoic acid. The ester-forming derivatives of the dicarboxylic acids can also be used as the component (1). Examples are lower alkyl esters, aryl esters and acid halides of dicarboxylic acids.

Examples of the low-molecular-weight glycol as component (2) are ethylene glycol, trimethylene glycol, tetramethylene glycol, neopentylene glycol, hexamethylene glycol, decamethylene glycol, cyclohexanedimethylol, 2,2-bis($\beta$-hydroxyethoxyphenyl)propane, hydroquinone, and 2,2-bis(hydroxyphenyl)propane. Tetramethylene glycol is especially preferred. The ester-forming derivatives of the low-molecular-weight glycols can also be used as the component (2). Examples are lower fatty acid esters of the glycols, and ethylene oxides of the glycols.

Examples of suitable polyoxyalkylene glycols as component (3) are polyethylene glycol, polypropylene glycol, polytrimethylene glycol, polytetramethylene glycol and copolymers of two or more of these. Polytetramethylene glycol is especially preferred. The ester-forming derivatives of polyoxyalkylene glycols can also be used as component (3). Examples are lower fatty acid esters of these polyoxyalkylene glycols. The polyoxyalkylene glycol as component (3) has an average molecular weight of 500 to 5,000, preferably 600 to 4,000, more preferably 800 to 3,000. The proportion of the polyoxyalkylene glycol to be copolymerized is desirably 5 to 95% by weight, preferably 5 to 85% by weight, more preferably 10 to 80% by weight, especially preferably 15 to 75% by weight.

When the amount of the rubbery elastomer is less than 0.5% based on the total weight of the aromatic polyester and the flat glass flakes, the intended effect is small, and when it exceeds 50%, the rigidity of shaped articles is reduced.

The polyester composition of this invention can be produced by mixing the required ingredients. For example, the flat glass flakes and the epoxy compound and as optional ingredients, the powdery inorganic solid, the phosphorus compound and/or the rubbery elastomer are added to the molten aromatic polyester and mixed. Or a method can be employed which comprises mixing the aromatic polyester chips, the flat glass flakes and the epoxy compound and optionally, the powdery inorganic solid, phosphorus compound and/or elastomer, and effecting further mixing under melting conditions. Prior to use, the flat glass flakes (and powdery inorganic solid) may be surface-treated with a coupling agent.

The polyester composition of this invention may include ordinary additives such as nucleating agents, lubricants, antioxidants, ultraviolet light absorbers, heat stabilizers, pigments and modifiers other than epoxy compounds in amounts which do not impair the objects of this invention. Other thermoplastic resins or thermosetting resins may also be incorporated into the composition of this invention. These compounds can be added at any desired stage in the production of the polyester.

Furthermore, fire-retarding additives may be incorporated into the polyester composition of this invention. Such additives are composed of fire retardants or a combination of them with fire retardant aids. The fire retardants are, for example, compounds containing halogen, phosphorus, nitrogen, etc. such as organic halogen compounds and phosphorus compounds. The fire retardant aids are, for example, compounds of metals of Group Vb of the periodic table. A number of compounds useful as fire retardants and fire retardant aids have been known heretofore, and they can also be used in this invention. Suitable fire retarding additives are mixtures of organic or inorganic antimony compounds (for example, antimony trioxide) and organic halogen compounds (especially brominated or chlorinated organic compounds), especially a mixture of antimony trioxide and a carbonate of a halogenated bisphenol or its oligomer. Preferred carbonates of halogenated bisphenol or oligomers thereof are those having the following structure

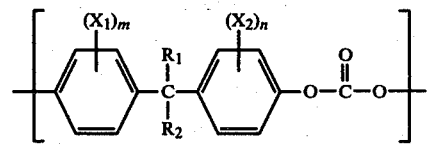

wherein $R_1$ and $R_2$ each represent a hydrogen atom, an alkyl group containing 1 to 4 carbon atoms, or a phenyl group, $X_1$ $X_2$ represent a bromine or chlorine atom, and m and n are numbers of 1 to 4; and having an average degree of polymerization of 2 to 30, preferably 2 to 25. In the above formula, the terminal groups may be any organic groups such as phenyl, substituted phenyl or alkyl. Since the flat glass flakes (and the powdery inorganic solid) are incombustible, a sufficient fire retarding effect can be obtained by incorporating the fire retardant in an amount of 10 to 50 parts by weight, preferably 15 to 30 parts by weight, per 100 parts by weight of the polyester composition.

The polyester composition of this invention gives shaped articles which are free from warping and have a high heat distortion temperature and superior mechanical properties and dimensional stability. By taking advantage of these merits, the polyester composition of this invention is useful in automobiles, electric appliances, mechanical devices and instruments, especially in small-sized structural component parts such as watches and cameras.

The following Examples taken in conjunction with Controls illustrate the present invention in greater detail. All parts in these examples are by weight.

EXAMPLES 1 TO 7 AND CONTROLS 1 TO 6

To 100 parts of polytetramethylene terephthalate having a reduced viscosity ($\eta_{sp/c}$) of 1.15 were added the flat glass flakes and epoxy compounds shown in Table 1 in the amounts indicated. Each of the mixtures was melt-kneaded and extruded at a cylinder temperature of 250° C. using an extruder having a screw diameter of 65 mm to form pellets. The pellets were molded by an injection molding machine to form samples suitable for the ASTM testing methods shown in Table 1, and the samples were evaluated. The results are shown in Table 1.

In the Controls, the epoxy compound was omitted, or mica was used instead of the glass flakes. Otherwise, the same procedure as above was repeated. The results are also shown in Table 1.

As is clearly seen from the results shown in Table 1, the shaped articles prepared from the compositions of this invention have very high impact strength, tensile strength and flexural strength. In contrast, the shaped articles prepared from the compositions not containing the epoxy compound are inferior in the aforesaid properties. When mica is used instead of the glass flakes, the mechanical strength of a shaped article prepared from the composition containing the epoxy compound is not much different from that of a shaped article prepared from the composition not containing the epoxy compound. In other words, when mica is added, there is hardly any increase in the mechanical strength of shaped articles by the addition of the epoxy compound as intended by the present invention.

Each of the compositions of Example 3 and Control 3 was molded into discs having a thickness of 1/16 inch and a diameter of 4 inches by an injection molding machine. Each of the discs was placed on a flat table made of precision cast iron, and the maximum clearance

TABLE 1

| Example | Filler Type | Filler Amount (parts) | Epoxy compound Type [Amount (parts)] | Impact strength ASTM D 256 ¼ inch (kg cm/cm) | Impact strength ASTM D 256 ½ inch (kg cm/cm) | Tensile characteristics ASTM D 638 Strength (kg/cm$^2$) | Tensile characteristics ASTM D 638 Elongation (%) | Flexural characteristics ASTM D 790 Strength (kg/cm$^2$) | Flexural characteristics ASTM D 790 Modulus of elasticity (kg/cm$^2$) | Heat distortion temp. ASTM D 648 264 psi (°C.) |
|---|---|---|---|---|---|---|---|---|---|---|
| (Ex.) 1 | Flat glass flakes (aspect ratio 20–50) | 20 | *Epikote 815 (0.8) | 5.4 | 5.7 | 630 | 3.3 | 980 | 44,000 | 130 |
| Ex. 2 | Flat glass flakes (aspect ratio 20–50) | 40 | *Epikote 815 (0.8) | 5.0 | 5.5 | 720 | 3.2 | 1,100 | 62,000 | 166 |
| Ex. 3 | Flat glass flakes (aspect ratio 20–50) | 70 | *Epikote 815 (0.8) | 4.9 | 5.1 | 850 | 3.0 | 1,300 | 90,000 | 190 |
| Ex. 4 | Flat glass flakes (aspect ratio 20–50) | 100 | *Epikote 815 (0.8) | 4.8 | 4.6 | 990 | 2.8 | 1,480 | 119,000 | 202 |
| Ex. 5 | Flat glass flakes (aspect ratio 20–50) | 70 | Epikote 815 (0.1) | 5.0 | 5.0 | 820 | 3.0 | 1,250 | 89,000 | 203 |
| Ex. 6 | Flat glass flakes (aspect ratio 20–50) | 70 | Epikote 815 (2.0) | 4.8 | 4.9 | 870 | 2.9 | 1,360 | 90,500 | 200 |
| Ex. 7 | Flat glass flakes (aspect ratio 20–50) | 70 | **Denacol EX-820 (1.0) | 5.2 | 5.3 | 840 | 3.1 | 1,280 | 88,500 | 201 |
| Control 1 | Flat glass flakes (aspect ratio 20–50) | 20 | None | 4.7 | 5.4 | 590 | 2.9 | 920 | 42,500 | 134 |
| Control 2 | Flat glass flakes (aspect ratio 20–50) | 40 | None | 4.2 | 4.8 | 645 | 2.7 | 990 | 61,000 | 169 |
| Control 3 | Flat glass flakes (aspect ratio 20–50) | 70 | None | 3.5 | 3.9 | 720 | 2.3 | 1,090 | 89,000 | 192 |
| Control 4 | Flat glass flakes (aspect ratio 20–50) | 100 | None | 2.8 | 3.0 | 800 | 2.1 | 1,190 | 116,000 | 204 |
| Control 5 | ***Mica (No. 3) | 70 | Epikote 815 (0.8) | 3.2 | 3.4 | 730 | 1.6 | 1,030 | 114,000 | 194 |
| Control 6 | ***Mica (No. 3) | 70 | None | 2.9 | 3.3 | 715 | 1.5 | 1,000 | 117,000 | 195 |

*Epoxy resin made by Shell Chemical Co.
**Epoxy resin made by Nagase Sangyo K.K.
***Mica made by Osaka Mica Kogyo K.K.

between the table surface and the disc was measured by a height gauge. In the shaped article of Example 3, the clearance was 0.05 mm, while in the shaped article of Control 3, it was 0.08 mm. Hence, the shaped article obtained in Example 3 had less warping.

Test pieces for tensile testing in accordance with ASTM D-638 were prepared from the compositions of Example 3 and Control 3. These test pieces were placed in a Geer's aging tester at 185° C. for the periods indicated in Table 2, and then their tensile strengths were measured. The results are shown in Table 2.

TABLE 2

| | Tensile strength (kg/cm²) | | |
|---|---|---|---|
| | After 5 days | After 10 days | After 20 days |
| Example 3 | 935 | 810 | 580 |
| Control 3 | 710 | 520 | 360 |

It is seen from Table 2 that the shaped article from the composition of this invention has very good thermal stability.

EXAMPLES 8 TO 12 AND CONTROLS 7 TO 12

To 100 parts of polytetramethylene terephthalate having a reduced viscosity ($\eta_{sp/c}$) of 1.50 were added the flat glass flakes, the powdery inorganic solids and epoxy compounds shown in Table 3 in the amounts indicated. Each of the mixtures was melt-kneaded and extruded at a cylinder temperature of 250° C. by using an extruder with a screw diameter of 65 mm to form pellets.

The pellets were molded by an injection molding machine to form molded pieces suitable for the ASTM testing methods shown in Table 3. The molded pieces were tested, and the results are shown in Table 3.

Molded pieces having a weld were produced by molding in a mold for ASTM D-638 consisting of a dumbbell and a gate at both ends adapted to generate a weld forcible at the central part of the dumbbell.

In the Controls, the epoxy compound was omitted or glass fibers were used instead of the glass flakes. Otherwise, the same procedure as above was repeated, and the results are also shown in Table 3.

TABLE 3

| Example | Flat glass flakes (aspect ratio 20–50) (parts) | Powdery inorganic solid [Amound (parts)] | Epoxy compound [Amound (parts)] | Tensile characteristics ASTM D-638 | | Weld strength ratio | Flexural characteristics ASTM D-790 | |
|---|---|---|---|---|---|---|---|---|
| | | | | Strength (kg/cm²) | Elongation (%) | | Strength (kg/cm²) | Modulus of elasticity (kg/cm²) |
| (Ex.) 8 | 35 | *Minex 7 (35) | ***Epikote 815 (2.5) | 690 | 4.5 | 0.85 | 1,200 | $65 \times 10^3$ |
| Ex. 9 | 50 | Minex 7 (15) | Epikote 815 (2.5) | 760 | 4.0 | 0.81 | 1,300 | $75 \times 10^3$ |
| Ex. 10 | 15 | Minex 7 (15) | Epikote 815 (2.5) | 610 | 5.5 | 0.90 | 1,000 | $45 \times 10^3$ |
| Ex. 11 | 35 | Calcium carbonate (35) | Epikote 815 (4.0) | 670 | 3.7 | 0.84 | 1,150 | $65 \times 10^3$ |
| Ex. 12 | 35 | Kaolin clay (35) | ****Denacol EX-810 (0.5) | 660 | 3.5 | 0.83 | 1,140 | $64 \times 10^3$ |
| Control 7 | 50 | Minex 7 (15) | None | 660 | 3.2 | 0.48 | 1,100 | $73 \times 10^3$ |
| Control 8 | 95 | Minex 7 (60) | Epikote 815 (2.5) | 900 | 3.0 | 0.37 | 1,480 | $93 \times 10^3$ |
| Control 9 | 60 | Minex 7 (95) | Epikote 815 (2.5) | 710 | 3.3 | 0.38 | 1,230 | $70 \times 10^3$ |
| Control 10 | **Glass fiber 35 | Minex 7 (35) | Epikote 815 (2.5) | 1,200 | 3.5 | 0.35 | 1,800 | $80 \times 10^3$ |
| Control 11 | 35 | Calcium carbonate (35) | None | 580 | 3.1 | 0.77 | 1,040 | $64 \times 10^3$ |
| Control 12 | 35 | Kaolin clay (35) | None | 575 | 2.9 | 0.77 | 1,010 | $64 \times 10^3$ |

*a feldspar type mineral sold by Shiraishi Kogyo K.K.
**chopped strand, fiber length 3 mm
***Epoxy resin made by Shell Chemical Co.
****Epoxy resin made by Nagase Sangyo K.K.

The results given in Table 3 demonstrate that the shaped articles prepared from the compositions of this invention have a very high weld strength ratio and superior tensile strength and flexural strength. In contrast, the shaped article prepared from the composition of Control 7 which does not contain the epoxy compound has a far lower weld strength ratio and lower tensile strength and flexural strength than the shaped article prepared from the composition of Example 9.

The shaped articles prepared from the compositions of Controls 8 and 9 which contain the flat glass flakes or the powdery inorganic solid in amounts exceeding the specified ranges in this invention have a far lower weld strength ratio.

The shaped article prepared from the composition of Control 10 containing glass fibers instead of the flat glass flakes has higher tensible strength and flexural strength but far lower weld strength ratio than the shaped article prepared from the composition of Example 8. The absolute value of the tensile strength of a weld-containing shaped article was 587 kg/cm² in Example 8, but as low as 420 kg/cm² in Control 10.

Discs having a thickness of 1/16 inches and a diameter of 4 inches were prepared by an injection molding machine from the compositions of Example 8 and Control 10. The discs were placed on a flat table made of precision cast iron, and the maximum clearance between the table surface and the disc was measured by a height gauge. It was 0.04 mm in Example 8, but 7.2 mm in Control 10, showing that the shaped article of Example 8 has very much reduced warping.

Test pieces for tensile testing in accordance with ASTM D-638 were prepared from the compositions of Examples 9, 11 and 12 and Controls 7, 11 and 12, and were each placed in a Geer's aging tester at 185° C. for the periods indicated in Table 4. Then, the tensile strengths of these pieces were measured, and the results are shown in Table 4.

TABLE 4

| | Tensile strength (kg/cm$^2$) | | |
|---|---|---|---|
| | After 5 days | After 10 days | After 20 days |
| Example 9 | 805 | 735 | 515 |
| Example 11 | 705 | 650 | 470 |
| Example 12 | 685 | 615 | 435 |
| Control 7 | 665 | 475 | 330 |
| Control 11 | 575 | 430 | 300 |
| Control 12 | 560 | 405 | 275 |

It is seen from the results shown in Table 4 that the shaped articles from the compositions of this invention have very good thermal stability.

EXAMPLES 13 TO 15 AND CONTROLS 13 TO 15

To 100 parts of polytetramethylene terephthalate having a reduced viscosity ($\eta_{sp/c}$) of 1.50 were added the flat glass flakes, the epoxy compounds and phosphorus compounds and optionally the powdery inorganic solid or Kaneace FM (a trademark for an acrylic graft copolymer produced by Kanegafuchi Chemical Industry Co., Ltd.) shown in Table 5 in the amounts indicated. Each of the mixtures was melt-kneaded and extruded at a cylinder temperature of 260° C. by an extruder having a screw diameter of 65 mm to form pellets.

The pellets were injection-molded, and the properties of the molded articles were measured. The results are shown in Table 5.

In the Controls, the phosphorus compound was omitted, and otherwise, the same procedure as above was repeated. The results are also shown in Table 5.

maintaining the cylinder temperature at 250° C., the mold temperature at 60° C., and the injection pressure at 1,000 kg/cm$^2$; and comparing the spiral lengths measured at the start of molding, the 5th shot, the 10th shot, the 15th shot, and the 20th shot.

As is clear from the results shown in Table 5, the variations in spiral length (i.e., the variations in flowability) from shot to shot are very little in the compositions of this invention. This means that the compositions of this invention have very good stability in the molten state. In contrast, in the compositions of the Controls, the absolute values of spiral length are low, and the spiral length becomes shorter progressively from shot to shot. This means that by the residence of the compositions in the cylinder, their flowabilities change, namely these compositions have poor stability in the molten state.

Discs, 1/16 inch thick and 4 inches in diameter, were prepared from the compositions of this invention. All of these discs were found to be substantially free from "warping".

EXAMPLE 16 AND CONTROLS 16 AND 17

To 100 parts by weight of polytetramethylene terephthalate having a reduced viscosity ($\eta_{sp/c}$) of 1.22 were added 15 parts by weight of flat glass flakes (aspect ratio of 30–50) and, powdery feldspar (Minex-7, a trademark for a product of Indusmin Company) and a polytetramethylene terephthalate-type block copolymer (HYTREL 4055, a trademark for a product of Du Pont) as a poly(ether.ester)elastomer in the amounts indicated in Table 6. Each of the mixtures was melt-kneaded and extruded at a cylinder temperature of 240° C. by an extruder having a screw diameter of 50 mm to form chips.

TABLE 5

| | | Example 13 | Control 13 | Example 14 | Control 14 | Example 15 | Control 15 |
|---|---|---|---|---|---|---|---|
| Resin formulation | Amount of flat glass flakes (aspect ratio 20–50) (parts) | 70 | 70 | 35 | 35 | 35 | 35 |
| | Epoxy compound Type | *Epikote 815 | Epikote 815 | **Denacol EX-810 | Denacol EX-810 | Epikote 828 | Epikote 828 |
| | Amount (parts) | 0.5 | 0.5 | 4.0 | 4.0 | 2.5 | 2.5 |
| | Phosphorus compound Type | Trimethyl phosphite | — | Sodium mono-phosphate | — | Tributyl phosphate | — |
| | Amount (parts) | 0.2 | — | 0.5 | — | 1.0 | — |
| | Powdery inorganic solid Type | — | — | Calcium carbonate | Calcium carbonate | ***Minex 7 | Minex 7 |
| | Amount (parts) | — | — | 35 | 35 | 35 | 35 |
| | ****Amount of Kaneace FM (parts) | — | — | — | — | 9 | 9 |
| Flowability | | | | | | | |
| At the start of molding (cm) | | 36 | 35 | 30 | 29 | 32 | 31 |
| At the 5th shot (cm) | | 36 | 34 | 30 | 26 | 32 | 29 |
| At the 10th shot (cm) | | 37 | 32 | 31 | 22 | 32 | 28 |
| At the 15th shot (cm) | | 38 | 29 | 32 | 18 | 33 | 26 |
| At the 20th shot (cm) | | 38 | 26 | 32 | 15 | 34 | 25 |
| Tensile strength (ASTM D-638, kg/cm$^2$) | | 849 | 853 | 668 | 660 | 600 | 610 |
| Break elongation (ASTM D-638, %) | | 3.1 | 2.9 | 3.1 | 3.0 | 6.4 | 4.7 |
| Flexural strength (ASTM D-790, kg/cm$^2$) | | 1,310 | 1,290 | 1,137 | 1,140 | 1,005 | 1,013 |
| Flexural modulus (ASTM D-790, kg/cm$^2$) | | 89,000 | 90,000 | 64,000 | 65,000 | 52,700 | 53,200 |

*Epoxy resin made by Shell Chemical Co.
**Epoxy resin made by Nagase Sangyo K.K.
***Feldspar mineral sold by Shiraishi Kogyo K.K.
****Rubbery copolymer made by Kanegafuchi Chemical Industry Co., Ltd.

In Table 5, the flowability of each composition was determined by molding the composition by an injection molding machine having a spiral mold (with a thickness of 3 mm and a width of 10 mm in cross section) while The chips were injection-molded by using a 1-ounce injection molding machine under the following conditions.

Molding temperature: 240° C.

Molding cycle: primary pressure (hydraulic pressure: 80 kg/cm²) 2 seconds; secondary pressure (hydraulic pressure: 50 kg/cm²) 8 seconds; and cooling time 25 seconds.

Mold temperature: 60° C.

The impact strengths (thickness: ¼ inch pieces, both notched and unnotched) and tap strengths of the molded articles were measured. The tap strength was measured by a simplified method which comprises providing a hole with a diameter of 4 mm in a ¼ inch test piece by a drilling machine, screwing a wooden screw having an outside diameter of 4.5 mm and a length of 5 cm into the hole, and measuring the length (cm) of the wooden screw which could be inserted until the shaped article was broken. The larger this value is, the higher is the tap strength.

Flat plates, 9.90 cm in length, 10.35 cm in width, and 0.2 cm in thickness, were prepared by using an in-line screw type injection molding machine made by Nikko Anker (3.5 ounces), and the percent molding shrinkages of the resulting flat plates wee measured. When the percent molding shrinkages in the longitudinal and transverse directions are more approximate to each other (that is, when the ratio of the percent shrinkages more approaches 1.0), the warping of the shaped article is smaller, and therefore, stress in shaped articles of various configurations is less. The results are shown in Table 6.

this invention has markedly increased impact strength and tap strength.

EXAMPLE 17 AND CONTROLS 18 AND 19

To 100 parts of polytetramethylene terephthalate having a reduced viscosity ($\eta_{sp/c}$) of 1.22 were added powdery feldspar (Minex-7, trademark), flat glass flakes (Glass Flake CF 48, a trademark for a product of Nippon Glass Fibers K.K.) and the same poly(ether.ester)elastomer as used in Example 16 in the amounts indicated in Table 7. Each of the mixtures was melt-kneaded and extruded at a cylinder temperature of 240° C. by using an extruder with a screw diameter of 50 mm to form chips.

The chips were injection molded by a 1-ounce injection molding machine under the following conditions.

Molding temperature: 240° C.

Molding cycle: primary pressure (hydraulic pressure: 80 kg/cm²) 2 seconds; secondary pressure (hydraulic pressure: 50 kg/cm²) 8 seconds; and the cooling time 25 seconds.

Mold temperature: 60° C.

The impact strengths (¼ inch thick test pieces, both notched and unnotched), tap strengths (the same as in Example 16) and heat distortion temperatures (¼ inch test pieces under a load of 264 psi) of the molded articles were measured.

Flat plates, 9.90 cm in length, 10.35 cm in width and 0.20 cm in thickness, were prepared by using an in-line screw type injection molding machine (3.5 ounces, made by Nikko Anker), and the percent molding shrinkages of the flat plates were measured.

TABLE 6

| | Amount (% by weight) | | | Properties of molded articles | | | | | |
|---|---|---|---|---|---|---|---|---|---|
| | Powdery feldspar | Elastomer | Epoxy compound (*) | Impact strength (¼inch) | | Tap strength (cm) | Percent molding shrinkage (%) | | Ratio of percent shrinkages |
| | | | | Notched | Unnotched | | Longitudinal | Transverse | |
| Example 16 | 15 | 5 | 0.5 | 5.2 | 75.2 | 1.01 | 1.35 | 1.69 | 1.25 |
| Control 16 | 15 | 5 | — | 5.1 | 71.5 | 0.95 | 1.38 | 1.73 | 1.25 |
| Control 17 | 15 | — | — | 4.6 | 50.0 | 0.75 | 1.40 | 1.75 | 1.25 |

(*): Denacol EX-314 (a trademark for glycerol polyglycidyl ether made by Nagase Sangyo K.K.)

As is clearly seen from the results shown in Table 6, the shaped article from the polyester composition of The results are shown in Table 7.

TABLE 7

| | Amounts added (parts) | | | | Properties of molded articles | | | | | | |
|---|---|---|---|---|---|---|---|---|---|---|---|
| | Powdery feldspar | Elastomer | Glass flakes | Epoxy compound (*) | Impact strength (¼") | | Tap strength (cm) | Percent molding shrinkage (%) | | Ratio of shrinkages | Heat distortion temp. (°C.) |
| | | | | | Notched | Unnotched | | Longitudinal | Transverse | | |
| Example 17 | 10 | 5 | 20 | 0.5 | 5.6 | 81.4 | 1.13 | 1.33 | 1.50 | 1.13 | 104 |
| Control 18 | 10 | 5 | 20 | — | 5.3 | 75.0 | 0.98 | 1.33 | 1.50 | 1.13 | 115 |
| Control 19 | 10 | 10 | 20 | — | 5.4 | 77.9 | 1.04 | 1.13 | 1.28 | 1.21 | 102 |

(*) Denacol EX-314

It is seen from the above table that the polyester composition of this invention gives a shaped article having superior impact strength (notched, and unnotched), tap strength and heat distortion temperature and reduced warping.

EXAMPLE 18

To 100 parts of polytetramethylene terephthalate having a reduced viscosity ($\eta_{sp/c}$) of 1.50 were added 80 parts of flat glass flakes having an aspect ratio of 20 to 50, 10 parts of a rubbery copolymer and 0.5 part of an epoxy compound (Denacol EX-810, a trademark). The mixture was melt-kneaded and extruded at a cylinder temperature of 250° C. by using an extruder having a diameter of 65 mm to form pellets.

Ten test pieces, 50 mm in width, 150 mm in length and 2 mm in thickness, for impact strength testing were prepared from these pellets, and tested in accordance with a ball falling test of JIS K6745-1976. All of the ten test pices were not broken by a 1 kg steel ball which was let fall from a height of 70 cm. This fact means that the composition shaped article prepared from the composition of this invention has very good impact strength.

Then, discs, 1/16 inch in thickness and 4 inches in diameter, were prepared from the pellets. Warping was scarcely seen in the discs.

The rubbery copolymer described above was prepared by the following steps (a) and (b).

(a) A polymerization vessel was charged with 1 part of disproportionated potassium rhodinate, 200 parts of water, 0.19 part of formaldehyde sodium sulfoxylate dihydrate, 0.005 part of ferrous sulfate and 0.01 part of disodium ethylenediaminetetraacetate, and they were heated at 60° C. in a stream of nitrogen. With stirring, a mixture consisting of 100 parts of butyl acrylate, 0.5 part of allyl methacrylate and 0.2 part of cumene hydroperoxide was added dropwise over the course of 5 hours. Furthermore the temperature was raised to 80° C., and the reaction was performed at this temperature for 3 hours to form a latex of polybutyl acrylate.

(b) A polymerization vessel was charged with 60 parts (as solids content) of the resulting polybutyl acrylate latex, 1 part of disproportionated potassium rhodinate, 200 parts of water (including the water in the latex). 0.19 part of formaldehyde sodium sulfoxylate dihydrate, 0.005 part of ferrous sulfate and 0.01 part of disodium ethylenediaminetetraacetate, and they were heated to 70° C. in a stream of nitrogen. With stirring, a mixture consisting of 24 parts of methyl methacrylate, 8 parts of styrene, 8 parts of acrylonitrile, 0.25 part of triallyl isocyanurate and 0.2 part of cumene hydroperoxide was added dropwise over the course of 2 hours. The temperature was raised further to 80° C., and the polymerization was continued at this temperature for 3 hours. The resulting copolymer was washed with water and dried in a customary manner to form the desired copolymer as a powder.

What we claim is:

1. A composition comprising (A) 100 parts by weight of an aromatic polyester, (B) 5 to 150 parts by weight of flat glass flakes up to one-half of which may be replaced by a powdery inorganic solid, and (C) 0.01 to 10% by weight, based on the total weight of (A) and (B), of an epoxy compound containing two terminal epoxy groups selected from the group consisting of (i) diglycidyl polyether (mono- to deca-mers) obtained by the reaction of 2,2-bis(4-hydroxyphenyl) propane (bisphenol A) with epichlorohydrin and (ii) diglycidyl ether obtained by the reaction of a glycol with epichlorohydrin.

2. A composition comprising (A) 100 parts by weight of an aromatic polyester, (B) 5 to 150 parts by weight of flat glass flakes up to one-half of which may be replaced by a powdery inorganic solid, (C) 0.01 to 10% by weight, based on the total weight of (A) and (B), of an epoxy compound containing two terminal epoxy groups selected from the group consisting of (i) diglycidyl polyether (mono- to deca-mers) obtained by the reaction of 2,2-bis(4-hydroxyphenyl) propane (bisphenol A) with epichlorohydrin and (ii) diglycidyl ether obtained by the reaction of a glycol with epichlorohydrin, and (D) 0.01 to 5% by weight, based on the total weight of (A) and (B), of a phosphorus compound.

3. A composition comprising (A) 100 parts by weight of an aromatic polyester, (B) 5 to 150 parts by weight of flat glass flakes up to one-half of which may be replaced by a powdery inorganic acid, (C) 0.01 to 10% by weight, based on the total weight of (A) and (B), of an epoxy compound containing two terminal epoxy groups selected from the group consisting of (i) diglycidyl polyether (mono- to deca-mers) obtained by the reaction of 2,2-bis(4-hydroxyphenyl) propane (bisphenol A) with epichlorohydrin and (ii) diglycidyl ether obtained by the reaction of a glycol with epichlorohydrin, and (D) 0.5 to 50% by weight, based on the total weight of (A) and (B), of a rubbery elastomer selected from the group consisting of copolymers containing 30 to 90% of an acrylic ester as a constituent monomer and poly (ether.ester) elastomers.

4. A composition comprising (A) 100 parts by weight of an aromatic polyester, (B) 5 to 150 parts by weight of flat glass flakes up to one-half of which may be replaced by a powdery inorganic solid, (C) 0.01 to 10% by weight, based on the total weight of (A) and (B), of an epoxy compound containing two terminal epoxy groups selected from the group consisting of (i) diglycidyl polyether (mono- to deca-mers) obtained by the reaction of 2,2-bis(4-hydroxyphenyl) propane (bisphenol A) with epichlorohydrin and (ii) diglycidyl ether obtained by the reaction of a glycol with epichlorohydrin, (D) 0.01 to 5% by weight, based on the total weight of (A) and (B), of a phosphorus compound, and (E) 0.5 to 50% by weight of a rubbery elastomer selected from the group consisting of copolymers containing 30 to 90% of an acrylic ester as a constituent monomer and poly(ether.ester) elastomers.

5. The composition of claim 1 wherein the flat glass flakes have a long diameter of not more than 1000 microns and an aspect ratio of at least 5.

6. The composition of claim 5 wherein the long diameter is from 1 to 500 microns and the aspect ratio is at least 10.

7. The composition of claim 2 wherein the flat glass flakes have a long diameter of from 1 to 500 microns and an aspect ratio of at least 10.

8. The composition of claim 3 wherein the flat glass flakes have a long diameter of from 1 to 500 microns and an aspect ratio of at least 10.

9. The composition of claim 4 wherein the flat glass flakes have a long diameter of from 1 to 500 microns and an aspect ratio of at least 10.

* * * * *